Figure 1:
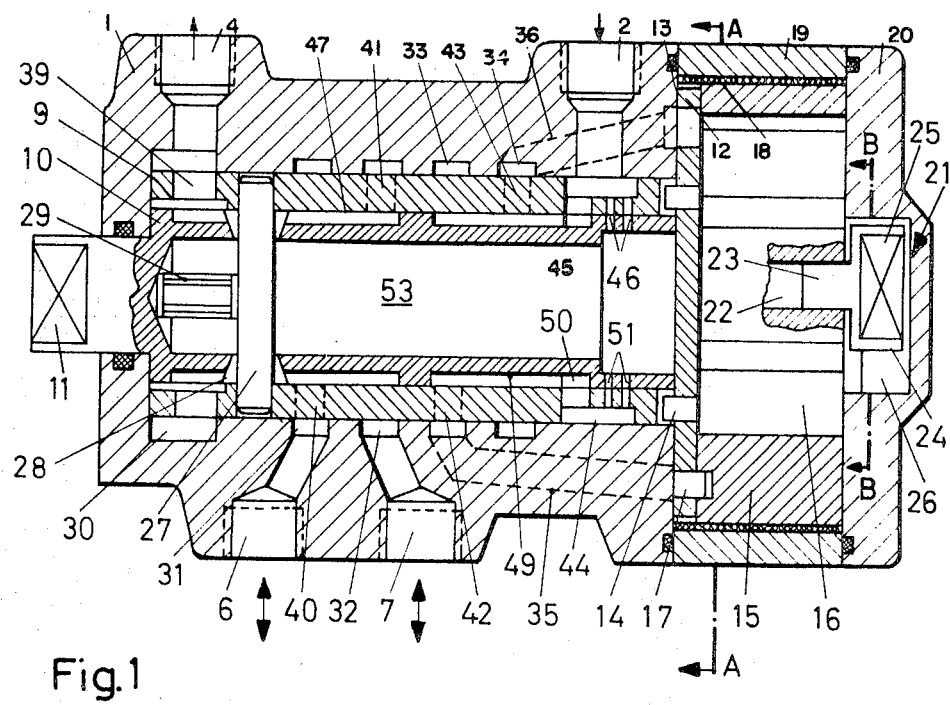

United States Patent

[11] 3,584,985

| [72] | Inventor | Johannes Vagn Baatrup |
| | | Soderborg, Denmark |
| [21] | Appl. No. | 824,190 |
| [22] | Filed | May 13, 1969 |
| [45] | Patented | June 15, 1971 |
| [73] | Assignee | Danfoss A/S |
| | | Nordborg, Denmark |
| [32] | Priority | May 11, 1968 |
| [33] | | Germany |
| [31] | | P 17 55 460.8 |

[54] HYDROSTATIC CONTROL EQUIPMENT PARTICULARLY FOR STEERING SYSTEMS
4 Claims, 4 Drawing Figs.

| [52] | U.S. Cl. | 418/61, 180/79.2 |
| [51] | Int. Cl. | F01c 1/10 |
| [50] | Field of Search | 91/56, 67, 68; 103/130, 131; 230/146; 123/8; 60/525; 180/79.2; 418/61 |

[56] References Cited
UNITED STATES PATENTS

| RE.25,126 | 2/1962 | Charlson | 91/56 |
| 2,989,951 | 6/1961 | Charlson | 91/68 |
| 3,270,683 | 9/1966 | McDermott | 103/130 |
| 3,391,608 | 7/1968 | Huber | 91/56 |
| 3,405,603 | 10/1968 | Woodling | 91/56 |
| 3,425,448 | 2/1969 | Peterson | 91/56 X |
| 3,431,863 | 3/1969 | Waldorff | 103/131 |
| 3,443,378 | 5/1969 | Monroe et al. | 91/56 |

*Primary Examiner*—Martin P. Schwadron
*Assistant Examiner*—Irwin C. Cohen
*Attorney*—Wayne B. Easton ABSTRACT: The invention relates to a hydrostatic control unit for vehicle steering systems or the like. The unit has a gerotor-type metering motor, inlet and outlet ports and two motor ports which are connectable to a piston and cylinder-type motor of the kind used for actuating a vehicle steering linkage. The unit has changeover valve means having a neutral position and left and right operating positions relates to the two directions of rotation of the metering motor. The metering motor comprises ring and star members with the ring member being capable of only rotational movement and the star member being capable of only orbital movement. Commutator-type valve means is provided which has the form of a disc and is connected to the ring member for rotation therewith.

HYDROSTATIC CONTROL EQUIPMENT PARTICULARLY FOR STEERING SYSTEMS

The invention relates to hydrostatic control equipment, particularly for steering systems, and comprising a metering motor consisting of an outer toothed ring and an inner toothed wheel having one fewer teeth, the central point of one toothed element moving over a circular path, the equipment also comprising a commutator valve, the first part of which rotates at the same speed as the toothed ring and the second part of which rotates at the same speed as the toothed wheel, and a changeover valve which has a neutral position, and on both sides thereof, two operating positions each associated with a direction of rotation, and the first part of which valve is connected to a rotatable actuating shaft and the second part of which is rotatably connected to the second part of the commutator valve, the valves being formed by using a housing, comprising the connecting ports, and two rotary slide sleeves arranged concentrically therein and relatively to each other.

U.S. Pat. No. 2,984,215, to the contents of which reference is made as regards the mode of operation of such hydrostatic control equipment, discloses equipment wherein the opposite cylindrical surfaces of the two sleeves and the bore of the housing that accommodates them are provided with various openings, recesses and grooves in such manner that the changeover valve is formed by the opposite circumferential surfaces of the inner and outer sleeves and the commutator valve by the opposite circumferential surfaces of the outer sleeve and of the housing. The internally toothed ring is fixed. The externally toothed wheel is connected to the outer sleeve through a universal-joint shaft.

This known construction operates very satisfactorily, but, like all equipment of this kind, suffers losses by leakage, since, due to the rotary movement of the parts that slide over each other, it is not possible to achieve a complete seal between adjacent openings through which the fluid passes under differing pressures. The losses due to leakage while not causing any loss in capacity, nevertheless interfere with the proportionality between the movement of the work motor and the copied movement of the metering motor, so that efforts are made to keep them as low as possible. This can be done by very carefully machining the surfaces that slide one over the other, but this results in increased costs. Furthermore, adjacent orifices of differing pressure in a circumferential surface to be sealed can be spaced farther apart in the axial or circumferential directions. This however makes the dimensions of the control equipment too great; the increase in the diameter of the sleeves also leads to increased friction. These problems become particularly difficult if the valve openings have to be relatively large, since the pressure drop should not be too great, despite the great quantities of fluid that flow through.

The object of the invention therefore is to keep the losses due to leakage in hydrostatic control equipment of this kind as low as possible without having to accept the above-mentioned disadvantages.

According to the invention, this object is achieved by the changeover valve and the commutator valve being separated from each other in such manner that the two parts of the changeover valve are formed by the sleeves, but the two parts of the commutator valve are formed by a disc of greater diameter than the sleeves and an annular end-face of the housing.

The following results are obtained by this separation of the valves. The entire length and the entire circumference of the sleeves are available for distributing the changeover valve orifices and, possibly, the neutral position orifices in such a way that in each case there is an adequate distance, in the the axial and circumferential directions, between adjacent orifices where differing pressures obtain. In the case of the commutator valve, orifices, under alternating pressure, must be provided on a circumferential line, the number of these orifices corresponding to twice the number of teeth on one of the toothed elements. By the use of the disc of greater diameter in combination with the end-face of the housing, these commutator valve orifices can be arranged at greater distances apart in the peripheral direction, so that losses due to leakage are reduced. Despite this, the dimensions of the equipment and the losses due to friction are not appreciably altered.

Conversely, with the help of the invention, the control equipment can be of the smaller construction or produced at a lower cost as the result of larger tolerances being permitted, if losses due to leakage hitherto suffered can be accepted.

In a preferred embodiment, the toothed ring is rotatably mounted and the disc is coupled both to the toothed ring and to the outer sleeve so that it does not rotate relatively thereto. In this case, the disc acts not only as part of the commutator valve, but also as a coupling member between two components of different diameter, which are arranged side-by-side in the axial direction with a small gap between them.

In a further form of the invention, the disc can bear against the toothed ring and the toothed wheel and can form a separating wall as regards the space within the sleeves, and the toothed wheel can have, on that side remote from the disc, a guide which secures the toothed wheel against rotation, but permits its center point to move over a circular path. Here, the disc also takes over the function of separating the metering pump and the space within the sleeves, all rotatable parts of the arrangement, except the toothed wheel, executing a straightforward rotational movement.

Figure 4:
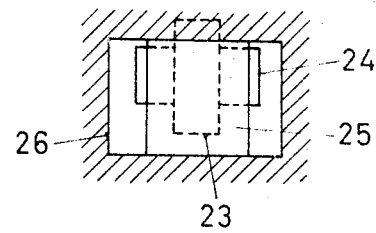
Figure 2:
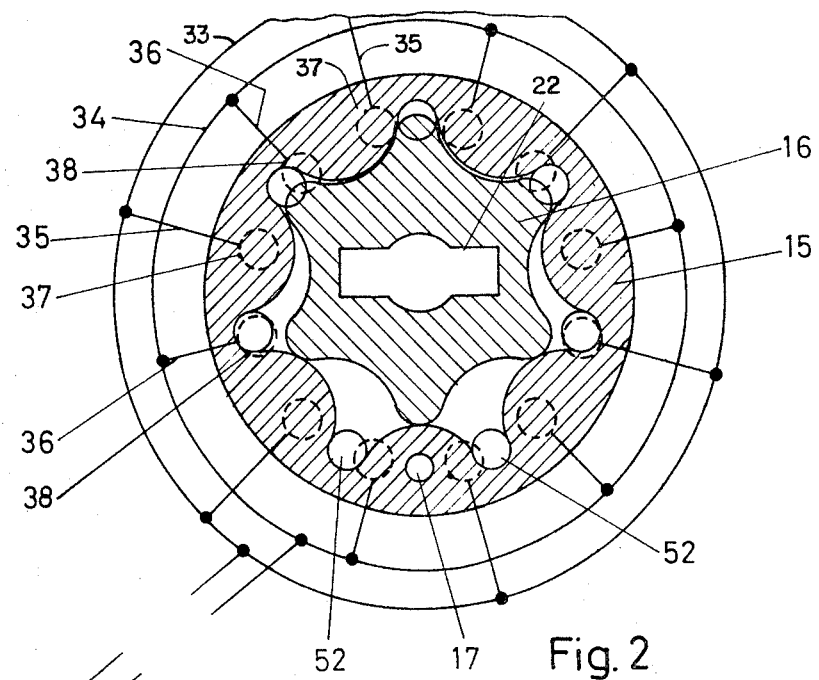
Figure 3:
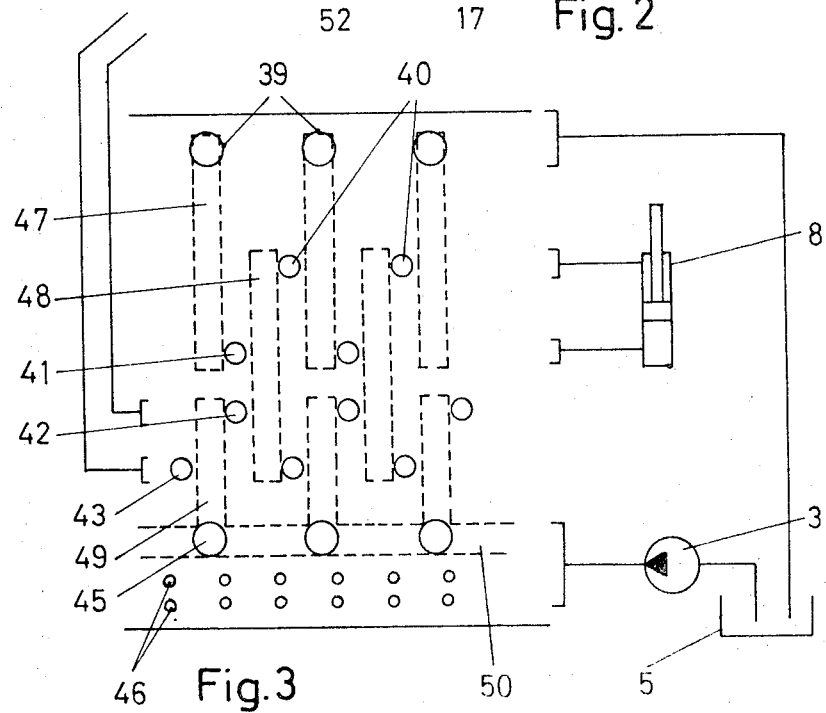

The invention will now be described in more detail by reference to an embodiment illustrated in the drawing, in which:

FIG. 1 shows a longitudinal section through control equipment in accordance with the invention, FIG. 2 is a schematic section through the metering motor on the line A–a of FIG. 1, FIG. 3 shows schematically the rotary slide sleeves in developed form, and FIG. 4 is a section through the guide arrangement on line B–b of FIG. 1.

A housing 1 has a port 2 for connection to the pump 3, a port 4 for connection to a sump 5, and two ports 6 and 7 for connection to a work cylinder 8. An outer rotary slide sleeve 9 and an inner rotary slide sleeve 10 are contained in a bore of the housing. The sleeve 10 merges into a shaft 11, on which an actuating member, e.g. a steering wheel, can be fitted. A disc 12 lies against the end-face 13 of the housing 1 and is coupled by way of pins 14 to the outer sleeve 9 in such manner that it does not rotate relatively thereto. Alongside the disc 12 is located a metering motor, which consists of an internally toothed ring 15 and an externally toothed wheel 16. The toothed ring 15 is coupled through pins 17 to the disc 12 in such manner as not to rotate relatively thereto and runs in an annular motor housing 19, a friction reducing insert 18 being interposed. This housing is sealed at its end by a cover plate 20, which contains a guide means 21 for the toothed wheel 16. The housing 1, the annular motor housing 19 and the cover plate 20 are interconnected by screwbolts, not illustrated in the drawing.

The guide means comprises a longitudinal slot 22 in the toothed wheel 16 and a block 23 carrying a forked member 24, said block sliding in said slot. This forked member embraces a second block 25 which is displaceable in a transverse guide 26 in the cover plate 20. The effect of the guide arrangement is that the toothed wheel 16 is held against rotation, but its center point can execute a movement over a circular path.

Secured in the outer sleeve 9 is a transverse pin 27 which extends loosely through an orifice 28 in the inner sleeve 10. The spring arrangement 29 provides for both sleeves normally being located in a neutral middle position. When the shaft 11 is rotated, the inner sleeve 10 can however move in both rotary directions relatively to the outer sleeve 9, thereby overcoming the force of the spring 29, so that communications between pipes, to be described later, are established. In the extreme case, when the shaft 11 rotates, the pin 27 and therefore the outer sleeve 9 and also the disc 12 and the toothed ring 15 are driven round, so that the metering motor can function as a pump in cases of emergency.

On the left in the housing 1 is an annular chamber 30 which communicates with the discharge port 4. To the right of this are two annular chambers 31 and 32, which communicate with the ports 6 and 7 of the work motor. Then follow two annular chambers 33 and 34, which, through bores 35 and 36, respectively, lead to openings 37 and 38 in the commutator valve at the end-face 13 of the housing 1. These orifices are alternately connected to the pressure port and the discharge port. There are twelve such orifices 37 and 38 altogether, that is, twice the number of teeth on the wheel 16.

The outer sleeve contains, from left to right, openings 39, 40, 41, 42 and 43, which are located at the level of the annular chambers 30—34 and which are distributed over the circumference in the manner seen from FIG. 3. In this figure, the solid lines represent the outer sleeve 9 and the broken lines the inner sleeve 10. Finally, there follows in the outer sleeve 9, an annular chamber 44 having openings 45 and neutral position orifices 46, which all communicate with the pump connection port 2. In the first sleeve 10 there are first longitudinal grooves 47, which extend between the openings 39 and 41, second longitudinal grooves 48, which extend between the openings 40 and 43, and third longitudinal grooves 49, which extend between the openings 42 and 45. The last-named longitudinal grooves 49 are interconnected by a peripheral groove 50. This sleeve also contains neutral position openings 51, aligned with the neutral position openings 46.

Provided in the disc 12 near each of the gaps between the teeth on the ring 15 are openings 52 which cooperate with the orifices 37 and 38. In the neutral position illustrated in the drawing, the fluid under pressure flows from the port 2 through the neutral position openings 46 and 51 and into the interior 53 of the sleeve 10 and thence to the discharge orifice 4 by way of the openings 28 and 39.

If, with the help of the shaft 11, the inner sleeve 10 is rotated to the right for example, the neutral position openings 46 and 51 move out of contact. Fluid under pressure then flows from the port 2 through the openings 45 into the longitudinal grooves 49 and thence, by way of the openings 42 and the passages 35, to the commutator valve and to the metering motor. Thence, the fluid under pressure passes through the commutator valve and the passages 36, the openings 43, the longitudinal grooves 48 and the openings 40 to the work motor and from there back to the discharge point by way of the openings 41, the longitudinal grooves 47 and the openings 39. In the inner sleeve 10 is rotated in the opposite direction, fluid passes through the metering motor and the work motor in the opposite direction. The basic principle of the invention can of course also be used in such control equipment in which the toothed wheel both moves over a circular path and executes a rotary movement, or the toothed ring moves over a circular path and the toothed wheel executes a rotary movement.

I claim:

1. A hydrostatic control unit for steering systems or the like comprising, a casing, said casing having inlet and outlet ports and two motor ports, a metering motor having an outer toothed ring and an inner toothed wheel with one fewer teeth, means for mounting said ring for solely rotatable movement relative to said casing and means for mounting said wheel for solely orbital movement relative to said casing, fluid passages in said casing, a commutator valve, means attaching said commutator valve to said ring for rotation therewith and cooperation with said passages to feed fluid to and exhaust fluid from said motor, and changeover valve means having a neutral position and two operating positions each related to a direction of rotation of said metering motor.

2. A hydrostatic control unit according to claim 1 wherein said commutator valve is a disc in axial abutting engagement with said ring and said wheel.

3. A hydrostatic control unit according to claim 2 wherein said changeover valve means includes inner and outer sleeves, means connecting said outer sleeve to said disc for rotation therewith.

4. A hydrostatic control unit according to claim 3 wherein said casing forms adjacent separate chambers for said metering motor and said sleeves, said disc forming a separating wall between said chambers.